US012670110B2

(12) United States Patent
Mahurin et al.

(10) Patent No.: US 12,670,110 B2
(45) Date of Patent: Jun. 30, 2026

(54) CLOCK DOMAIN TRANSFER INTERFACE FOR HIGH BANDWIDTH DATA TRANSFER USING EVENT TRANSFER BLOCKS

(71) Applicant: QUALCOMM Incorporated, San Diego, CA (US)

(72) Inventors: Eric Wayne Mahurin, Austin, TX (US); Hitesh Kumar Gupta, Sunnyvale, CA (US); Francisco Perez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 18/601,341

(22) Filed: Mar. 11, 2024

(65) Prior Publication Data

US 2025/0021498 A1     Jan. 16, 2025

Related U.S. Application Data

(60) Provisional application No. 63/513,088, filed on Jul. 11, 2023.

(51) Int. Cl.
G06F 13/16     (2006.01)

(52) U.S. Cl.
CPC ...... G06F 13/1689 (2013.01); G06F 13/1673 (2013.01)

(58) Field of Classification Search
CPC .... G06F 13/1689; G06F 13/1673; G06F 1/12; G06F 1/08; G06F 1/06; G06F 1/10
See application file for complete search history.

(56) References Cited

U.S. PATENT DOCUMENTS

| | | | | | |
|---|---|---|---|---|---|
| 6,718,449 | B2 * | 4/2004 | Phi | ...................... | G11C 7/1072 |
| | | | | | 711/149 |
| 7,134,035 | B2 * | 11/2006 | Sharma | .................... | G06F 1/12 |
| | | | | | 713/400 |
| 8,630,358 | B2 * | 1/2014 | Maji | ........................ | H04L 7/02 |
| | | | | | 327/1 |
| 12,176,064 | B2 * | 12/2024 | Born | .................... | G11C 7/1078 |

(Continued)

OTHER PUBLICATIONS

Intel: "SCFIFO and DCFIFO IP Cores User Guide", Nov. 6, 2017, pp. 1-33, XP093204019, the whole document.

(Continued)

*Primary Examiner* — Raymond N Phan
(74) *Attorney, Agent, or Firm* — Seyfarth Shaw LLP

(57) ABSTRACT

A clock domain crossing interface is described. The clock domain crossing interface includes a transmit clock domain and a receive clock domain using a different clock from the transmit clock domain. The clock domain crossing interface also includes a first-in-first-out (FIFO) buffer coupled between the transmit clock domain and the receive clock domain. The FIFO buffer to store ordered transactions sent from the transmit clock domain to the receive clock domain. The clock domain crossing interface further includes a transmit clock domain event transfer block to notify the receive clock domain of a new transaction pushed onto the FIFO buffer in the transmit clock domain. The clock domain crossing interface also includes a receive clock domain event transfer block to notify the transmit clock domain of a new transaction pulled from the FIFO buffer in the receive clock domain.

19 Claims, 8 Drawing Sheets

(56)     References Cited

U.S. PATENT DOCUMENTS

| 2012/0079144 A1* | 3/2012 | Shumsky | ................. | G06F 5/12 |
| | | | | 710/57 |
| 2014/0052951 A1* | 2/2014 | Kulmala | .............. | G06F 3/0656 |
| | | | | 711/165 |
| 2014/0376569 A1* | 12/2014 | Philip | ....................... | G06F 1/12 |
| | | | | 370/503 |
| 2016/0328182 A1* | 11/2016 | Goikhman | ............ | G06F 3/0688 |
| 2019/0317548 A1 | 10/2019 | Thong | | |

OTHER PUBLICATIONS

International Search Report and Written Opinion—PCT/US2024/032019—ISA/EPO—Sep. 30, 2024.

* cited by examiner

100

202

FULLY CONNECTED

204

LOCALLY CONNECTED

210

212

214

216

206

CONVOLUTIONAL

208

400

Figure 5:
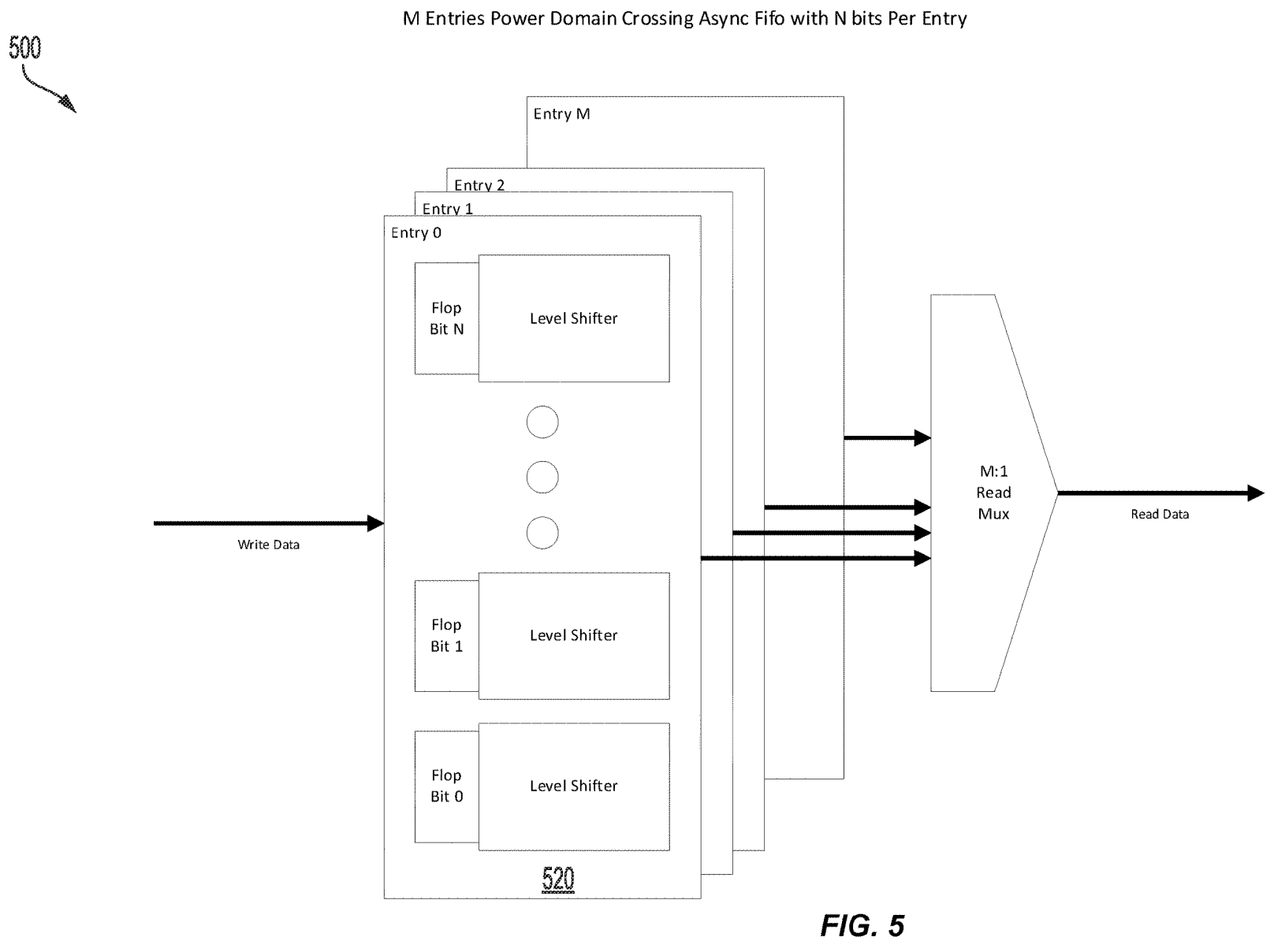

M Entries Power Domain Crossing Async Fifo with N bits Per Entry

Read Data

M:1
Read
Mux

Entry M

Entry 2

Entry 1

Entry 0

Flop
Bit N

Level Shifter

Flop
Bit 1

Level Shifter

Flop
Bit 0

Level Shifter

520

Write Data

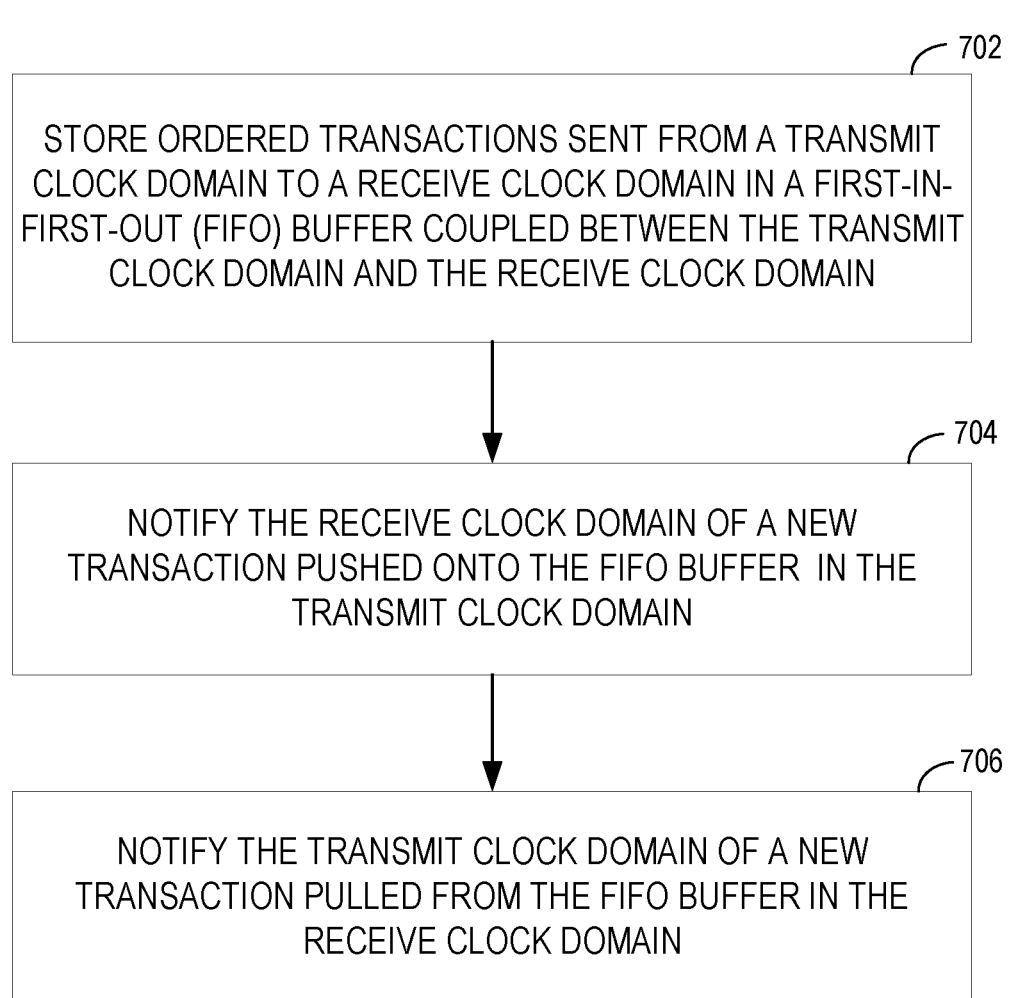

700

702

STORE ORDERED TRANSACTIONS SENT FROM A TRANSMIT CLOCK DOMAIN TO A RECEIVE CLOCK DOMAIN IN A FIRST-IN-FIRST-OUT (FIFO) BUFFER COUPLED BETWEEN THE TRANSMIT CLOCK DOMAIN AND THE RECEIVE CLOCK DOMAIN

704

NOTIFY THE RECEIVE CLOCK DOMAIN OF A NEW TRANSACTION PUSHED ONTO THE FIFO BUFFER IN THE TRANSMIT CLOCK DOMAIN

706

NOTIFY THE TRANSMIT CLOCK DOMAIN OF A NEW TRANSACTION PULLED FROM THE FIFO BUFFER IN THE RECEIVE CLOCK DOMAIN

*FIG. 7*

CLOCK DOMAIN TRANSFER INTERFACE FOR HIGH BANDWIDTH DATA TRANSFER USING EVENT TRANSFER BLOCKS

CROSS-REFERENCE TO RELATED APPLICATION

The present application claims the benefit of U.S. Provisional Patent Application No. 63/513,088, filed Jul. 11, 2023, and titled "AREA EFFICIENT ASYNCHRONOUS FIRST-IN-FIRST-OUT (FIFO) BUFFER FOR HIGH BANDWIDTH DATA TRANSFER USING EVENT TRANSFER BLOCKS," the disclosure of which is expressly incorporated by reference in its entirety.

TECHNICAL FIELD

Certain aspects of the present disclosure relate to artificial neural networks and, more particularly, to an area efficient asynchronous first-in-first-out (FIFO) buffer for high bandwidth data transfer using event transfer blocks.

BACKGROUND

An artificial neural network, which may include an interconnected group of artificial neurons, may be a computational device or may represent a method to be performed by a computational device. Artificial neural networks may have corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks are useful in applications where the complexity of the task/data makes the design of the function burdensome using conventional techniques.

In computing, hardware acceleration is the use of computer hardware to perform some functions more efficiently than is possible in software running on a general-purpose central processing unit (CPU). The hardware that performs the acceleration may be referred to as a hardware-accelerator. Machine learning (ML)-accelerators may improve the performance of artificial neural networks. ML-accelerators may read activation and weight data from memory, process the data in compute logic, and write the processed data back to memory. As a result, ML workloads involve increased memory bandwidth to supply a significant amount of data transferred every cycle between memory and the compute logic. Unfortunately, transmitting many bits every cycle between a memory domain and a compute logic domain involves crossing many power domains using asynchronous first-in-first-out (FIFO) buffers, which are expensive in terms of area consumption and power consumption.

SUMMARY

A clock domain crossing interface is described. The clock domain crossing interface includes a transmit clock domain and a receive clock domain using a different clock from the transmit clock domain. The clock domain crossing interface also includes a first-in-first-out (FIFO) buffer coupled between the transmit clock domain and the receive clock domain. The FIFO buffer to store ordered transactions sent from the transmit clock domain to the receive clock domain. The clock domain crossing interface further includes a transmit clock domain event transfer block to notify the receive clock domain of a new transaction pushed onto the FIFO buffer in the transmit clock domain. The clock domain crossing interface also includes a receive clock domain event transfer block to notify the transmit clock domain of a new transaction pulled from the FIFO buffer in the receive clock domain.

A processor-implemented method for a clock domain crossing interface is described. The processor-implemented method includes storing ordered transactions sent from a transmit clock domain to a receive clock domain in a first-in-first-out (FIFO) buffer coupled between the transmit clock domain and the receive clock domain. The processor-implemented method also includes notifying the receive clock domain of a new transaction pushed onto the FIFO buffer in the transmit clock domain. The processor-implemented method further includes notifying the transmit clock domain of a new transaction pulled from the FIFO buffer in the receive clock domain.

This has outlined, broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for conducting the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5 is a block diagram further illustrating components in a clock domain crossing asynchronous first-in-first-out (FIFO) buffer, in accordance with various aspects of the present disclosure.

FIG. 7 is a flow diagram illustrating a processor-implemented method for a clock domain crossing interface, according to various aspects of the present disclosure.

DETAILED DESCRIPTION

Figure 1:
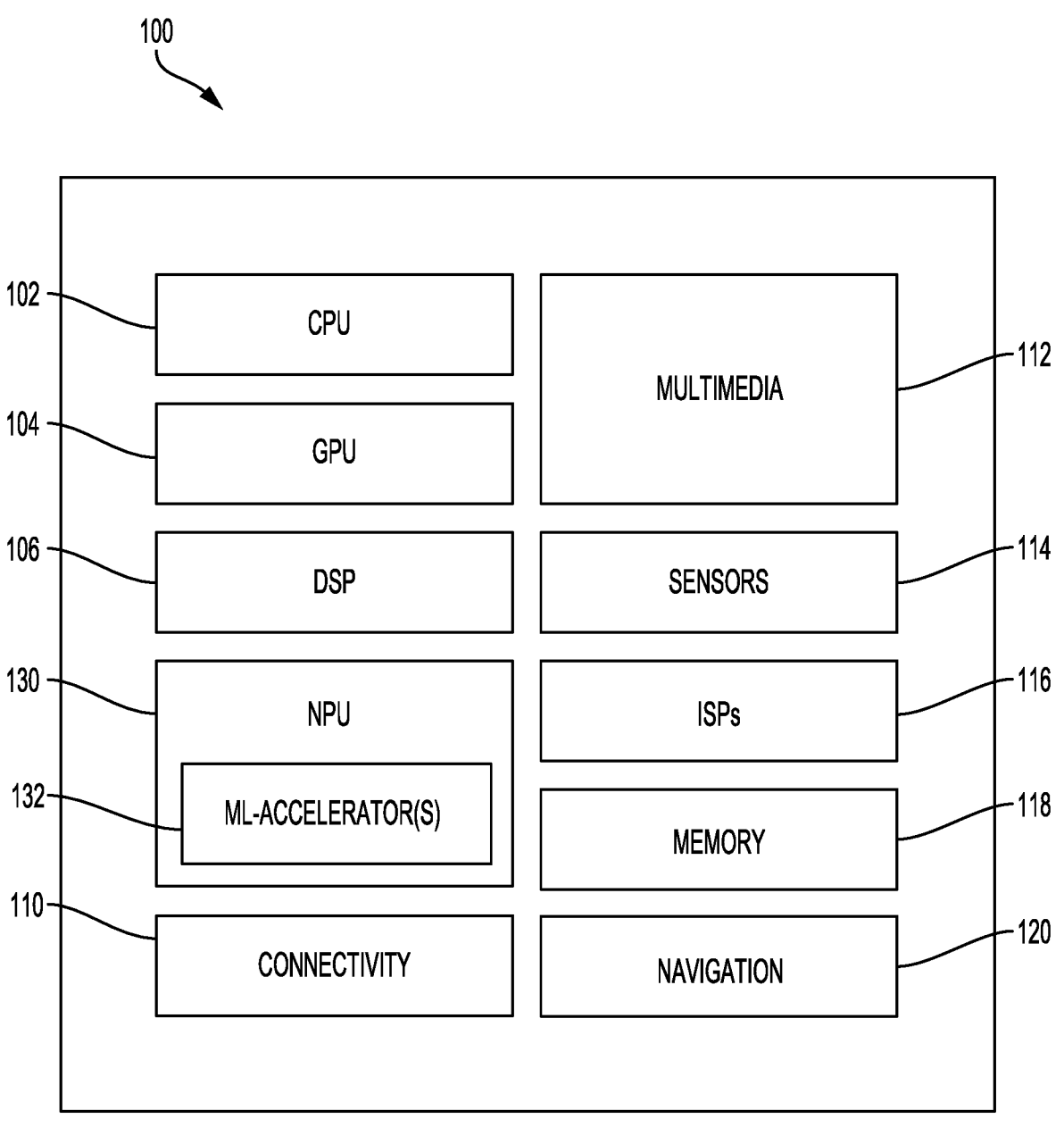
FIG. 1 illustrates an example implementation of designing an artificial intelligence inference accelerator (AIIA) for a neural network using a system-on-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. Nevertheless, it will be apparent to those skilled in the art that these concepts may be practiced without these specific details. In some instances, well-known structures and components are shown in block diagram form to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. Any aspect of the disclosure disclosed may be embodied by one or more elements of a claim.

Although aspects are described, many variations and permutations of these aspects fall within the scope of the disclosure. Although some benefits and advantages of the preferred aspects are mentioned, the scope of the disclosure is not intended to be limited to benefits, uses, or objectives. Rather, aspects of the disclosure are intended to be universally applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

In computing, hardware acceleration is the use of computer hardware to perform some functions more efficiently than is possible in software running on a general-purpose central processing unit (CPU). The hardware that performs the acceleration may be referred to as a hardware-accelerator. Machine learning (ML)-accelerators may improve the performance of artificial neural networks. ML-accelerators may read activation and weight data from memory, process the data in compute logic, and write the processed data back to memory. As a result, ML workloads involve high memory bandwidth to supply a significant amount of data transferred every cycle between memory and the compute logic of the ML-accelerators.

This increased memory bandwidth is achieved by operating the memory logic at a higher voltage level and a higher clock frequency level. Additionally, because the compute logic consumes a significant amount of energy, the compute logic is operated at a lower voltage level and a lower clock frequency level to achieve increased energy efficiency. As a result, transmitting many bits every cycle between a memory domain and a compute domain specified for operating ML-accelerators involves crossing power and clock domains using asynchronous first-in-first-out (FIFO) buffers.

Unfortunately, the asynchronous FIFO buffers used to transmit the substantial number of bits every cycle between a memory domain and a compute logic domain are expensive in terms of area consumption and power consumption. Standard asynchronous clock and voltage domain crossing FIFO buffers provided by an industry circuit team have a predetermined number of entries. A solution is desired for reducing the predetermined number of entries in the asynchronous FIFO buffers, in which the reduced number of entries in the asynchronous FIFO buffers help reduce area consumption and power consumption and improve timing.

Various aspects of the present disclosure are directed to area efficient asynchronous FIFO buffers with credit/debit for high bandwidth data transfer. Various aspects of the present disclosure utilize an event transfer block having a credit/debit mechanism rather than transmitting read and write pointers across clock/power domains to support the area efficient asynchronous FIFO buffer. In operation, an event transfer block is symmetric in both the clock and power domains and, therefore, the event transfer block module can be instantiated in both the clock and power domains to indicate FIFO push and pull events (e.g., a pull transaction event or a push transaction event). In various aspects of the present disclosure, decoupling the pointers used to access the array and counters in the event transfer block that transmit control data (e.g., read/write counts) across clock domains enables reduced sizing of the FIFO buffer to non-power of two, including an odd number of entries for providing reduced area and power consumption. This configuration advantageously enables simplified timing convergence.

FIG. 1 illustrates an example implementation of a system on chip (SoC) 100, which may include a central processing unit (CPU) 102 or multi-core CPUs, in accordance with certain aspects of the present disclosure, such as an area efficient asynchronous first-in-first-out (FIFO) buffer. Variables (e.g., neural signals and synaptic weights), system parameters associated with a computational device (e.g., neural network with weights), delays, frequency bin information, and task information may be stored in a memory block associated with a neural processing unit (NPU) 130, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

Figure 3:
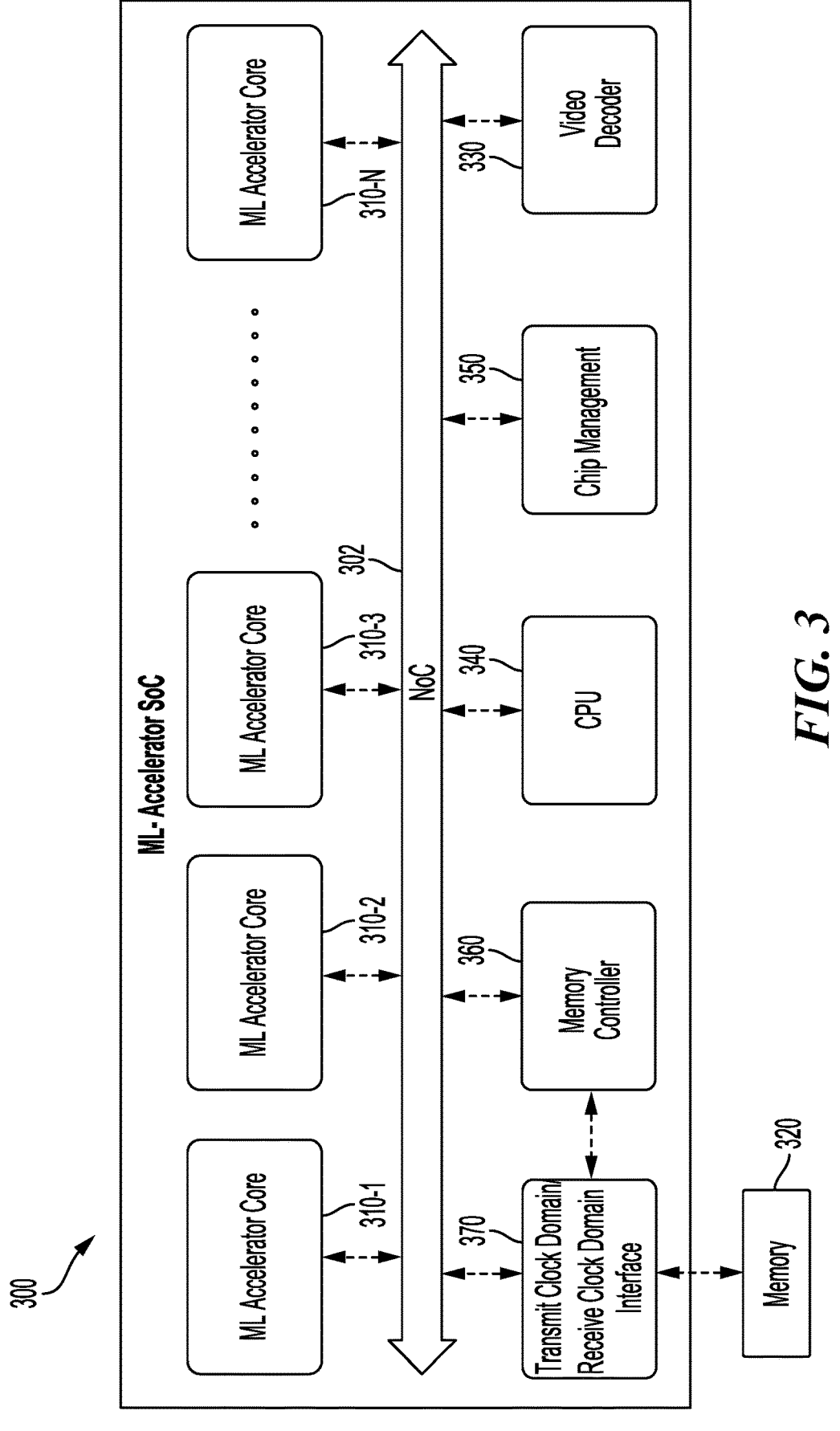
FIG. 3 is a block diagram illustrating a machine learning (ML)-accelerator system-on-chip (SoC) architecture, in accordance with various aspects of the present disclosure.

One aspect of the present disclosure is directed to an area efficient asynchronous FIFO buffer with a credit/debit mechanism for high-bandwidth data transfer between machine learning (ML)-accelerators 132 of the NPU 130 and the memory block 118. In operation, the ML-accelerators 132 may read activation and weight data from the memory block 118, process the data in compute logic, and write the processed data back to the memory block 118. As a result, ML workloads involve increased memory bandwidth to supply a significant amount of data transferred every cycle between the memory block 118 and the compute logic of the ML-accelerators 132. In practice, this increased memory bandwidth is achieved by operating memory logic of the memory block 118 at a higher voltage level and a higher clock frequency level. Additionally, because the compute logic consumes a significant amount of energy, the compute logic is operated at a lower voltage level and a lower clock frequency level to achieve increased energy efficiency. In various aspects of the present disclosure, an area efficient asynchronous FIFO buffer enables high bandwidth data transfer between a memory domain and a compute domain specified for operating the ML-accelerators 132, for example, as shown in FIG. 3.

The SoC 100 may also include additional processing blocks tailored to specific functions, such as a connectivity block 110, which may include fifth generation (5G) new radio (NR) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114 to provide sensor image data, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are like what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in diverse ways to recognize cars, trucks, and airplanes.

Neural networks may be designed with a variety of connectivity patterns. In feed-forward networks, information is passed from lower to higher layers, with each neuron in each layer communicating to neurons in higher layers. A hierarchical representation may be built up in successive layers of a feed-forward network, as described above. Neural networks may also have recurrent or feedback (also called top-down) connections. In a recurrent connection, the output from a neuron in each layer may be communicated to another neuron in the same layer. A recurrent architecture may be helpful in recognizing patterns that span more than one of the input data chunks that are delivered to the neural network in a sequence. A connection from a neuron in each layer to a neuron in a lower layer is called a feedback (or top-down) connection. A network with many feedback connections may be helpful when the recognition of a high-level concept may aid in discriminating the low-level features of an input.

Figure 2A:
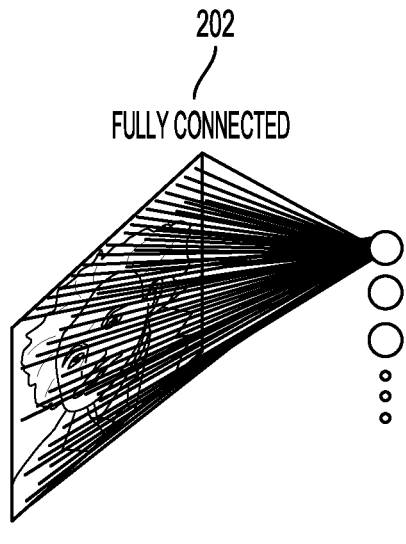
FIGS. 2A, 2B, and 2C are diagrams illustrating a neural network, in accordance with various aspects of the present disclosure.
Figure 2B:
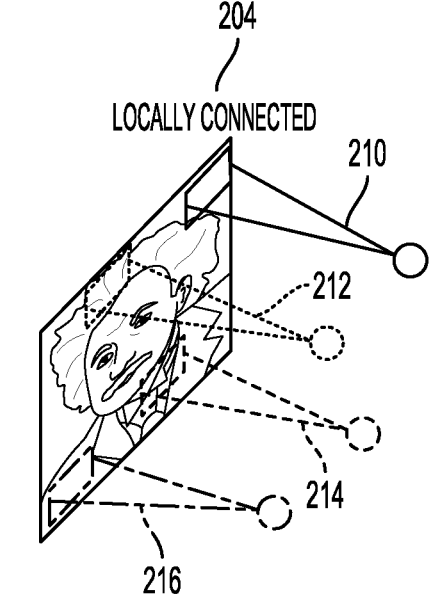

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer because the higher layer neurons in each region may receive inputs that are tuned through training to the properties of a restricted portion of the total input to the network.

Figure 2C:
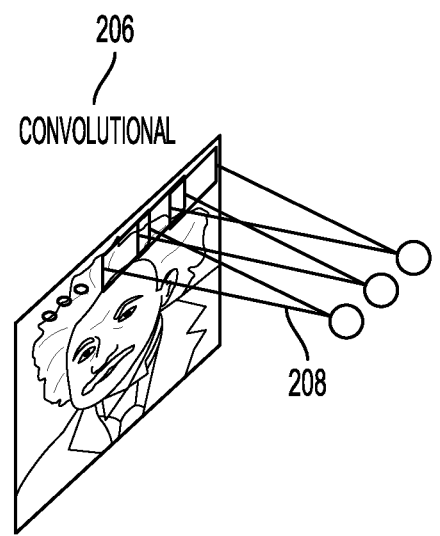

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
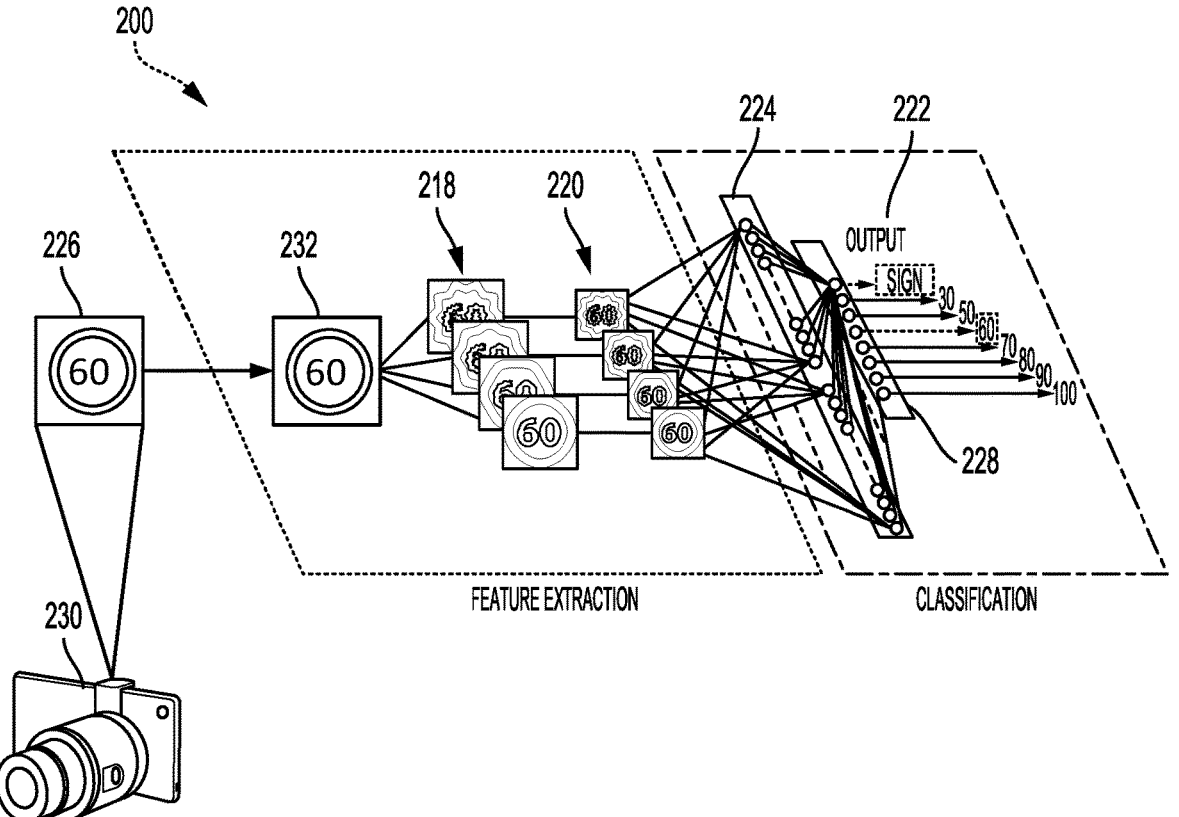
FIG. 2D is a diagram illustrating a neural network, in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different convolutional kernels were applied to the image 226 at the convolutional layer 232, four different feature maps are generated in the first set of feature maps 218. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a feature of the image 226, such as "sign," "60," and "100." A SoftMax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100." Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

In computing, hardware acceleration is the use of computer hardware to perform some functions more efficiently than is possible in software running on a general-purpose central processing unit (CPU). The hardware that performs the acceleration may be referred to as a hardware-accelerator. Machine learning (ML)-accelerators may improve the performance of artificial neural networks (e.g., the DCN 200). ML-accelerators may read activation and weight data from memory, process the data in compute logic, and write the processed data back to memory. As a result, machine learning workloads involve increased memory bandwidth to supply a significant amount of data transferred every cycle between memory and the compute logic of the ML-accelerators.

In practice, this increased memory bandwidth is achieved by operating the memory logic at a higher voltage level and a higher clock frequency level. Additionally, because the compute logic consumes a significant amount of energy, the compute logic is operated at a lower voltage level and a lower clock frequency level to achieve increased energy efficiency. As a result, transmitting many bits every cycle between a memory domain and a compute domain specified for operating ML-accelerators involves crossing many power domains using asynchronous first-in-first-out (FIFO) buffers that are expensive in terms of area consumption and power consumption. In particular, standard asynchronous clock and voltage domain crossing FIFO buffers have a predetermined number of entries. A solution is desired for reducing the predetermined number of entries in the asynchronous FIFO buffers to provide reduced area consumption and power consumption, and improved timing.

FIG. 3 is a block diagram illustrating a machine learning (ML)-accelerator system-on-chip (SoC) architecture, in accordance with various aspects of the present disclosure. As shown in FIG. 3, an ML-accelerator SoC 300 includes a set of ML-accelerator cores 310 (310-1, 310-2, 310-3, . . . , 310-N) coupled together through a network-on-chip (NoC) 302. In various aspects of the present disclosure, the ML-accelerator cores 310 are composed of neural signal processors (NSPs) executing ML network models. As shown in FIG. 3, the ML-accelerator SoC 300 includes a central processing unit (CPU) 340 and a chip management block 350 to control interoperation between the ML-accelerator cores 310 and a video decoder 330. Additionally, the ML-accelerator SoC 300 includes a memory controller 360 to access the memory 320. This configuration of the ML-accelerator SoC 300 includes a clock domain crossing interface 370 having an area efficient asynchronous first-in-first-out (FIFO) buffer for enabling high bandwidth data transfer between the memory 320 and the ML-accelerator cores 310, as further illustrated in FIG. 4.

Figure 4:
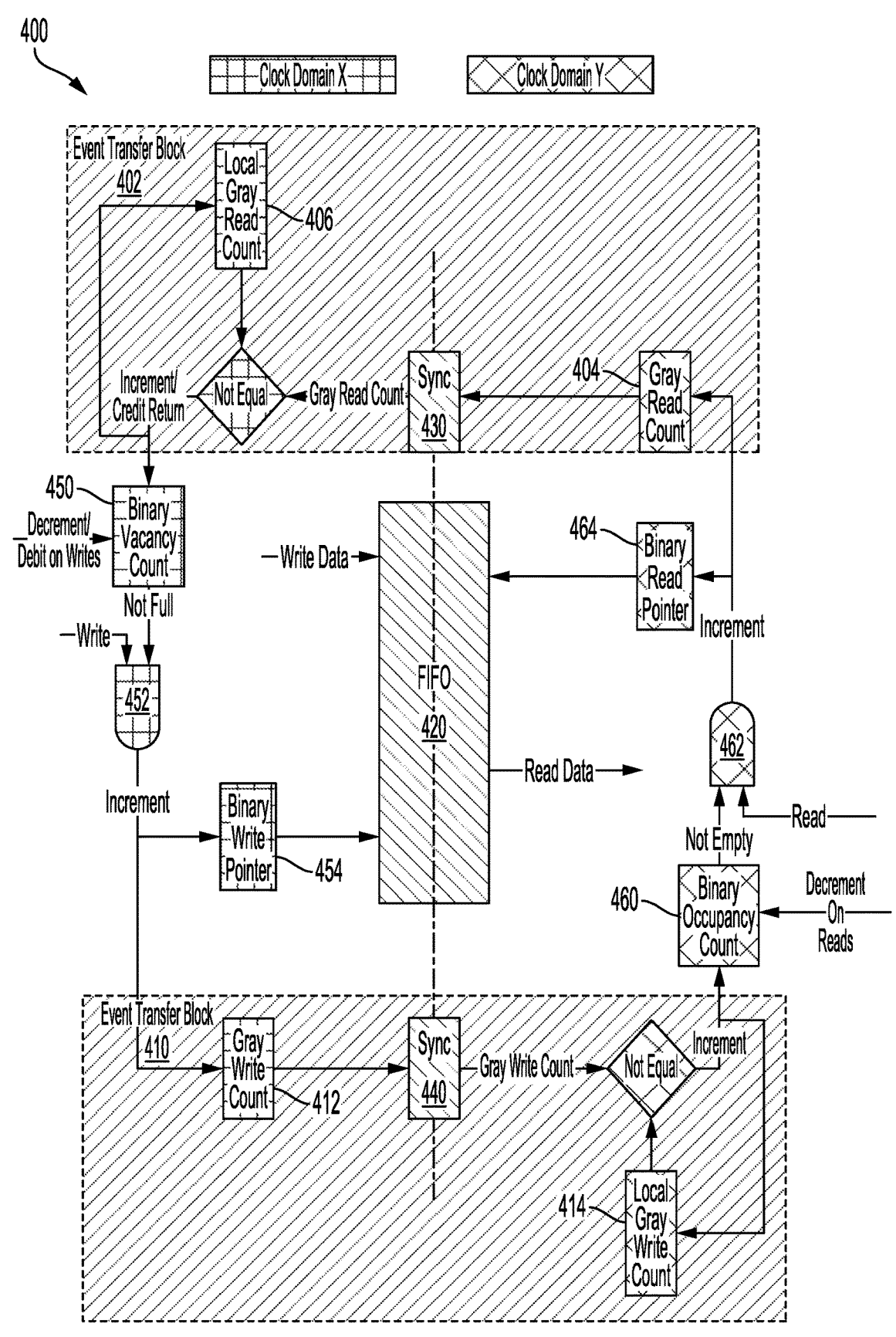
FIG. 4 is a block diagram illustrating a clock domain crossing interface, according to various aspects of the present disclosure.

FIG. 4 is a block diagram further illustrating the clock domain crossing interface 370 of FIG. 3, according to various aspects of the present disclosure. As shown in FIG. 4, a clock domain crossing interface 400 includes a first-in-first-out (FIFO) buffer 420 arranged between a transmit clock domain X and a receive clock domain Y. In various aspects of the present disclosure, the FIFO buffer 420 is implemented using a reduced number of entries. In this example, the FIFO buffer 420 transmits a gray read count to a first synchronizer 430 of a first event transfer block 402 and a gray write count through a second synchronizer 440 of a second event transfer block 410. In this example, the read count signals the number of pull transactions from the FIFO buffer 420 and the write count signals the number of push transactions onto the FIFO buffer 420. A read/write logic (see below) provides a vacancy/occupancy-based read/write control to/from the FIFO buffer 420 according to an available occupancy or an available vacancy of the FIFO buffer 420.

In these aspects of the present disclosure, the gray read count and the gray write count are transmitted between the transmit clock domain X and the receive clock domain Y, rather than the conventional transmission of read and write pointers between clock domains. Additionally, the first event transfer block 402 maintains a local gray read counter 406 for the transmit clock domain X, and the second event transfer block 410 maintains a local gray write counter 414 for the receive clock domain Y. During operation, the counters (e.g., the local gray read counter 406 and local gray write counter 414) count up-to a gray code value (e.g., FIFO size+1), rounded up to the nearest power of two (2). For example, the parameter FIFO size+1 is used to differentiate between an empty FIFO buffer state and a full FIFO buffer state. Additionally, rounding up the counters to the nearest power of two (2) reduces a complexity of an increment/decode logic of the clock domain crossing interface 400.

In various aspects of the present disclosure, a write requestor in the transmit clock domain X maintains a vacancy count in a binary vacancy count block 450, which is equal to the size of the FIFO buffer 420. In this example, the binary credit count indicates the number of free entries available in the FIFO buffer 420 analogous to the number of transactions that can be pushed onto the FIFO buffer 420. For example, to write into the FIFO buffer 420, the write requestor checks if any occupancy is available in the binary vacancy count block 450 (e.g., a vacancy count is not equal to zero). A transaction is pushed onto the FIFO buffer 420 if a credit is available (e.g., the FIFO buffer 420 is 'Not Full'), as determined at an AND logic gate 452. In various aspects of the present disclosure, the binary vacancy count block 450 controls a write to the FIFO buffer 420 according to a vacancy in the FIFO buffer 420 to push a write onto the FIFO buffer 420 in response to a received pull event from the first event transfer block 402.

During a write, the occupancy count is decremented (e.g., decrement on writes) at the binary vacancy count block 450, which is analogous to a credit/debit. Next, data (e.g., 'Write Data') is written into the FIFO buffer 420, and a binary write pointer block 454 (e.g., a local write pointer) is incremented for a next write transaction. Additionally, a gray write counter 412 of the second event transfer block 410 is incremented and a write count is transmitted to a receive clock domain (e.g., clock domain Y). In response, the transmitted write count is compared with the local gray write count in the receive clock domain (e.g., clock domain Y). If the values are not equal, the local gray write count and an occupancy count stored in a binary occupancy count block 460 are incremented by one (1). These counters keep on incrementing (e.g., assuming no reads occur) every receiving clock cycle until the local gray write count is equal to the transmitted 'Gray Write Count.' In various aspects of the present disclosure, the binary occupancy count block 460 controls a read from the FIFO buffer 420 according to an occupancy in the FIFO buffer 420 to pull the read from the FIFO buffer 420 in response to a received push event from the second event transfer block 410.

In some aspects of the present disclosure, if a read requestor in the receive clock domain Y is ready to accept a transaction, the read requestor checks if occupancy count stored in the binary occupancy count block 460 is not zero (e.g., 'Not Empty'). In this example, the binary occupancy count block indicates the number of entries occupied in the FIFO buffer 420, which is analogous to the number of transactions that can be pulled from the FIFO buffer 420. If the binary occupancy count block 460 is not zero, data (e.g., 'Read Data') is read out of the FIFO buffer 420 in response to an AND logic gate 462. Additionally, the binary occupancy count block 460 is decremented by one (1), and a binary read pointer block 464 (e.g., a local read pointer) is incremented by one (1) to access the FIFO buffer 420 for the next read. In this example, a gray read counter 404 of the first event transfer block 402 is incremented by one (1) and the read count is transmitted to the transmit clock domain (e.g., clock domain X) to return the credit back to the write requestor.

In operation, the transmitted read count (e.g., Gray Read Count) is compared with the local gray read count in the transmit clock domain (e.g., clock domain X). If the values are not equal, the binary vacancy count block 450 and the local gray read count are incremented by one (1), assuming no writes are taking place. This is analogous to a credit return. In this example, the binary vacancy count block 450 and the local gray read count continue incrementing until the local gray read count matches a transmitted read count (e.g., Gray Read Count) from the first synchronizer 430. Once all the entries are read, the write requestor eventually returns all the credits.

FIG. 5 is a block diagram further illustrating the clock domain crossing interface 370 of FIG. 3, according to various aspects of the present disclosure. As shown in FIG. 5, a power domain crossing interface 500 includes an M-entry power domain crossing first-in-first-out (FIFO) buffer 520 arranged between a first power domain X and a second power domain Y. In various aspects of the present disclosure, the FIFO buffer 520 is implemented using a reduced number of M-entries. In this example, the FIFO buffer 520 supports N-bits per entry (e.g., 0, 1, . . . , N), including a flop per bit and a corresponding level shifter. Operation of the FIFO buffer 520 may be performed according to FIG. 6.

Figure 6:
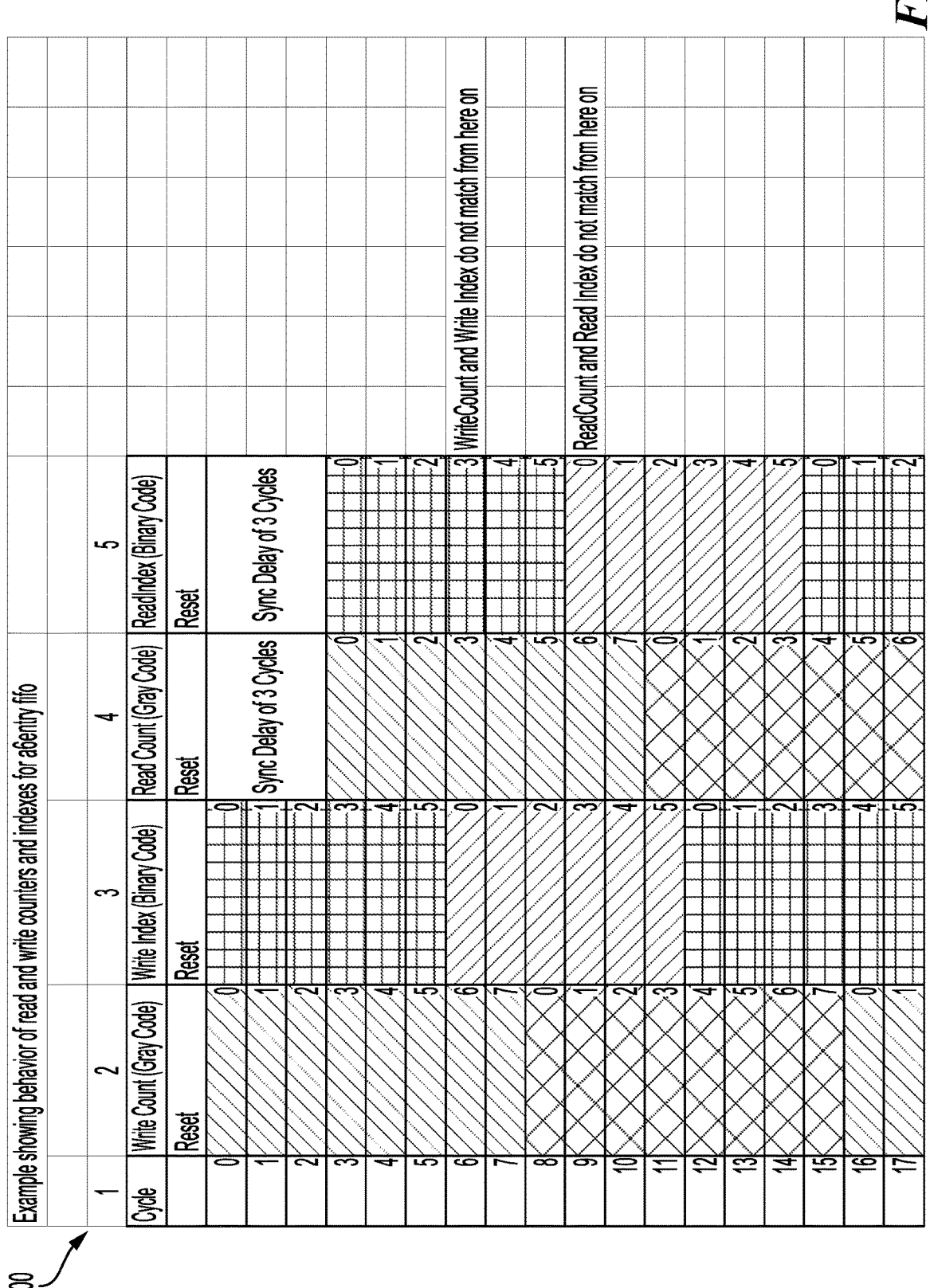
FIG. 6 is a diagram illustrating example behavior of the clock domain crossing interface of FIG. 4, in accordance with various aspects of the present disclosure.

FIG. 6 is a diagram illustrating example behavior of the clock domain crossing interface 400 of FIG. 4, in accordance with various aspects of the present disclosure. As shown in FIG. 6, columns 2 and 3 of a table 600 illustrate behavior of the gray write counter 412 of the second event transfer block 410 and the binary write pointer block 454 (of FIG. 4). Additionally, columns 4 and 5 of the table 600 illustrate behavior of the gray read counter 404 of the first event transfer block 402 and the binary read pointer block 464. In operation, as shown in cycle 6 of column 1, the gray write counter 412 of the second event transfer block 410 and the binary write pointer block 454 no longer match after cycle 6. Additionally, as shown in cycle 9 of column 1, the gray read counter 404 of the first event transfer block 402 and the binary read pointer block 464 no longer match after cycle 9. Columns 4 and 5 of the table 600 illustrate that the gray read counter 404 of the first event transfer block 402 and the binary occupancy count block 460 incur a synchronization delay of three (3) cycles. A processing flow for clock/voltage domain interface is illustrated, for example, in FIG. 7.

FIG. 7 is a flow diagram illustrating a processor-implemented method for a clock domain crossing interface, according to various aspects of the present disclosure. A method 700 begins at block 702, in which ordered transactions sent from a transmit clock domain to a receive clock domain are stored in a first-in-first-out (FIFO) buffer coupled between the transmit clock domain and the receive clock domain. For example, as shown in FIG. 4, the clock domain crossing interface 400 includes the FIFO buffer 420 arranged between the transmit clock domain X and the receive clock domain Y.

At block 704, the receive clock domain is notified of a new transaction pushed onto the FIFO buffer in the transmit clock domain. At block 706, the transmit clock domain is notified of a new transaction is pulled from the FIFO buffer in the receive clock domain. For example, as shown in FIG. 4, the gray read count and the gray write count are transmitted between the transmit clock domain X and the receive clock domain Y, rather than the conventional transmission of read and write pointers between clock domains. Additionally, the first event transfer block 402 maintains a local gray read counter 406 for the transmit clock domain X, and the second event transfer block 410 maintains a local gray write counter 414 for the receive clock domain Y. During operation, the counters (e.g., the local gray read counter 406 and local gray write counter 414) count up-to a gray code value (e.g., FIFO size+1), rounded up to the nearest power of two (2). For example, the parameter FIFO size+1 is used to differentiate between an empty FIFO buffer state and a full FIFO buffer state. Additionally, rounding up the counters to the nearest power of two (2) reduces a complexity of an increment/decode logic of the clock domain crossing interface 400.

In some aspects of the present disclosure, the method 700 may be performed by the SoC 100 (FIG. 1). That is, each of the elements of method 700 may, for example, but without limitation, be performed by the SoC 100 or one or more processors (e.g., CPU 102, the GPU 104, and/or NPU 130) and/or other components included therein.

Implementation examples are described in the following numbered clauses:

1. A clock domain crossing interface, comprising:
   a transmit clock domain;
   a receive clock domain using a different clock from the
      transmit clock domain;

a first-in-first-out (FIFO) buffer coupled between the transmit clock domain and the receive clock domain, in which the FIFO buffer to store ordered transactions sent from the transmit clock domain to the receive clock domain;

a transmit clock domain event transfer block to notify the receive clock domain of a new transaction pushed onto the FIFO buffer in the transmit clock domain; and a receive clock domain event transfer block to notify the transmit clock domain of a new transaction pulled from the FIFO buffer in the receive clock domain.

2. The clock domain crossing interface of clause 1, further comprising:

a transmit domain synchronizer;

a receive domain synchronizer; and the FIFO buffer coupled between the transmit domain synchronizer and the receive domain synchronizer.

3. The clock domain crossing interface of clause 2, in which the transmit domain synchronizer is used to exchange a gray read count between the receive clock domain and the transmit clock domain, and in which the receive domain synchronizer is used to exchange a gray write count between the transmit clock domain and the receive clock domain.

4. The clock domain crossing interface of any of clauses 1-3, further comprising a read/write logic to provide a vacancy/occupancy-based read/write control of the FIFO buffer.

5. The clock domain crossing interface of clause 4, in which the read/write logic comprises a binary vacancy count block to control a write to the FIFO buffer according to a gray read count from the receive clock domain event transfer block.

6. The clock domain crossing interface of clause 4, in which the read/write logic comprises a binary occupancy count block to control a read of the FIFO buffer according to a gray write count from the transmit clock domain event transfer block.

7. The clock domain crossing interface of clause 4, in which the read/write logic comprises a binary vacancy count block to control a write to the FIFO buffer according to a vacancy in the FIFO buffer to push the write onto the FIFO buffer in response to a received pull event from the receive clock domain event transfer block.

8. The clock domain crossing interface of clause 4, in which the read/write logic comprises a binary occupancy count block to control a read of the FIFO buffer according to an occupancy in the FIFO buffer to pull the read from the FIFO buffer in response to a received push event from the transmit clock domain event transfer block.

9. The clock domain crossing interface of any of clauses 1-9, further comprises a power domain crossing interface.

10. A processor-implemented method for a clock domain crossing interface, the processor-implemented method comprising:

storing ordered transactions sent from a transmit clock domain to a receive clock domain in a first-in-first-out (FIFO) buffer coupled between the transmit clock domain and the receive clock domain;

notifying the receive clock domain of a new transaction pushed onto the FIFO buffer in the transmit clock domain; and notifying the transmit clock domain of a new transaction pulled from the FIFO buffer in the receive clock domain.

11. The processor-implemented method of clause 10, further comprising:

exchanging, using a transmit clock domain synchronizer, a gray read count between the receive clock domain and the transmit clock domain;

exchanging, using a receive clock domain synchronizer, a gray write count between the transmit clock domain and the receive clock domain; and providing, using read/write logic, a vacancy/occupancy-based read/write control of the FIFO buffer, coupled between the transmit clock domain synchronizer and the receive clock domain synchronizer.

12. The processor-implemented method of clause 11, further comprising sending, by the transmit clock domain synchronizer, a push transaction event onto the FIFO buffer to the receive clock domain.

13. The processor-implemented method of clause 12, further comprising incrementing an occupancy count in a binary occupancy count block in the receive clock domain in response to the push transaction event onto the FIFO buffer from the transmit clock domain synchronizer.

14. The processor-implemented method of any of clauses 11-13, further comprising sending, by the receive clock domain synchronizer, a pull transaction event from the FIFO buffer to the transmit clock domain.

15. The processor-implemented method of clause 14, further comprising incrementing a vacancy count in a binary vacancy count block in the transmit clock domain in response to the pull transaction event from the FIFO buffer from the receive clock domain synchronizer.

16. The processor-implemented method of any of clauses 11-15, further comprising prohibiting a push of the new transaction onto the FIFO buffer when a vacancy count is zero.

17. The processor-implemented method of any of clauses 11-16, further comprising prohibiting a pull of the new transaction from the FIFO buffer when an occupancy count is zero.

18. The processor-implemented method of any of clauses 11-17, further comprising maintaining a read pointer in the receive clock domain as a function of a number of pulls from the FIFO buffer.

19. The processor-implemented method of any of clauses 11-18, further comprising maintaining a write pointer in the transmit clock domain as a function of a number of pushes onto the FIFO buffer.

20. The processor-implemented method of claim 11, further comprising:

decoupling a read pointer in the receive clock domain from a gray read count maintained by a transmit clock domain synchronizer; and decoupling a write pointer in the transmit clock domain from a gray write count maintained by a receive clock domain synchronizer to enable an odd number of entries in the FIFO buffer.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed, include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or general register files. Although the various components discussed may be described as having a specific location, such as a local component, they may also be configured in many ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the application and the overall design constraints imposed on the overall system.

The machine-readable media may comprise several software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/ or encoded) thereon, the instructions being executable by one or more processors to perform the operations described herein. For certain aspects, the computer program product may include packaging material.

Further, it should be appreciated that modules and/or other appropriate means for performing the methods and techniques described herein, may be downloaded and/or otherwise obtained by a user terminal and/or base station as applicable. For example, such a device can be coupled to a server to facilitate the transfer of means for performing the methods described herein. Alternatively, various methods described herein, may be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A clock domain crossing interface, comprising:
   a transmit clock domain;
   a receive clock domain using a different clock from the transmit clock domain;
   a first-in-first-out (FIFO) buffer coupled between the transmit clock domain and the receive clock domain, in which the FIFO buffer to store ordered transactions sent from the transmit clock domain to the receive clock domain;
   a transmit clock domain event transfer block to notify the receive clock domain of a new transaction pushed onto the FIFO buffer in the transmit clock domain;
   a receive clock domain event transfer block to notify the transmit clock domain of a new transaction pulled from the FIFO buffer in the receive clock domain;
   a transmit clock domain synchronizer to decouple a read pointer in the receive clock domain from a gray read count maintained by the transmit clock domain synchronizer; and
   a receive clock domain synchronizer to decouple a write pointer in the transmit clock domain from a gray write count maintained by the receive clock domain synchronizer.

2. The clock domain crossing interface of claim 1, in which the FIFO buffer is coupled between the transmit domain synchronizer and the receive domain synchronizer.

3. The clock domain crossing interface of claim 1, further comprising a read/write logic to provide a vacancy/occupancy-based read/write control of the FIFO buffer.

4. The clock domain crossing interface of claim 1, further comprises a power domain crossing interface.

5. The clock domain crossing interface of claim 2, in which the transmit domain synchronizer is used to exchange the gray read count between the receive clock domain and the transmit clock domain, and in which the receive domain synchronizer is used to exchange the gray write count between the transmit clock domain and the receive clock domain.

6. The clock domain crossing interface of claim 3, in which the read/write logic comprises a binary vacancy count block to control a write to the FIFO buffer according to the gray read count from the receive clock domain event transfer block.

7. The clock domain crossing interface of claim 3, in which the read/write logic comprises a binary occupancy count block to control a read of the FIFO buffer according to the gray write count from the transmit clock domain event transfer block.

8. The clock domain crossing interface of claim 3, in which the read/write logic comprises a binary vacancy count block to control a write to the FIFO buffer according to a vacancy in the FIFO buffer to push the write onto the FIFO buffer in response to a received pull event from the receive clock domain event transfer block.

9. The clock domain crossing interface of claim 3, in which the read/write logic comprises a binary occupancy count block to control a read of the FIFO buffer according to an occupancy in the FIFO buffer to pull the read from the FIFO buffer in response to a received push event from the transmit clock domain event transfer block.

10. A processor-implemented method for a clock domain crossing interface, the processor-implemented method comprising:

storing ordered transactions sent from a transmit clock domain to a receive clock domain in a first-in-first-out (FIFO) buffer coupled between the transmit clock domain and the receive clock domain;

notifying the receive clock domain of a new transaction pushed onto the FIFO buffer in the transmit clock domain;

notifying the transmit clock domain of a new transaction pulled from the FIFO buffer in the receive clock domain;

decoupling a read pointer in the receive clock domain from a gray read count maintained by a transmit clock domain synchronizer; and decoupling a write pointer in the transmit clock domain from a gray write count maintained by a receive clock domain synchronizer to enable an odd number of entries in the FIFO buffer.

11. The processor-implemented method of claim 10, further comprising:

exchanging, using the transmit clock domain synchronizer, the gray read count between the receive clock domain and the transmit clock domain;

exchanging, using the receive clock domain synchronizer, the gray write count between the transmit clock domain and the receive clock domain; and providing, using read/write logic, a vacancy/occupancy-based read/write control of the FIFO buffer, coupled between the transmit clock domain synchronizer and the receive clock domain synchronizer.

12. The processor-implemented method of claim 11, further comprising sending, by the transmit clock domain synchronizer, a push transaction event onto the FIFO buffer to the receive clock domain.

13. The processor-implemented method of claim 11, further comprising sending, by the receive clock domain synchronizer, a pull transaction event from the FIFO buffer to the transmit clock domain.

14. The processor-implemented method of claim 11, further comprising prohibiting a push of the new transaction onto the FIFO buffer when a vacancy count is zero.

15. The processor-implemented method of claim 11, further comprising prohibiting a pull of the new transaction from the FIFO buffer when an occupancy count is zero.

16. The processor-implemented method of claim 11, further comprising maintaining the read pointer in the receive clock domain as a function of a number of pulls from the FIFO buffer.

17. The processor-implemented method of claim 11, further comprising maintaining the write pointer in the transmit clock domain as a function of a number of pushes onto the FIFO buffer.

18. The processor-implemented method of claim 12, further comprising incrementing an occupancy count in a binary occupancy count block in the receive clock domain in response to the push transaction event onto the FIFO buffer from the transmit clock domain synchronizer.

19. The processor-implemented method of claim 13, further comprising incrementing a vacancy count in a binary vacancy count block in the transmit clock domain in response to the pull transaction event from the FIFO buffer from the receive clock domain synchronizer.

* * * * *